US012792473B2

(12) United States Patent
Nazari et al.

(10) Patent No.: US 12,792,473 B2
(45) **Date of Patent: *Nov. 10, 2026**

(54) EFFICIENT DATA TRANSMISSIONS BETWEEN STORAGE NODES IN REPLICATION RELATIONSHIPS

(71) Applicant: Nvidia Corporation, Santa Clara, CA (US)

(72) Inventors: Siamak Nazari, Mountain View, CA (US); Jonathan Andrew McDowell, Belfast (GB); Philip Herron, Lisburn (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,657

(22) Filed: Dec. 30, 2024

(65) Prior Publication Data

US 2025/0138959 A1 May 1, 2025

Related U.S. Application Data

(63) Continuation of application No. 18/277,949, filed as application No. PCT/US2022/017776 on Feb. 24, 2022, now Pat. No. 12,222,820.

(60) Provisional application No. 63/153,222, filed on Feb. 24, 2021.

(51) Int. Cl.

| | |
|---|---|
| ***G06F 11/00*** | (2006.01) |
| ***G06F 11/1446*** | (2026.01) |
| ***G06F 11/20*** | (2006.01) |

(52) U.S. Cl.
CPC ...... *G06F 11/1464* (2013.01); *G06F 11/2082* (2013.01)

(58) Field of Classification Search
CPC ............. G06F 11/1464; G06F 11/2082; G06F 11/1456; G06F 11/1448; G06F 11/2069; G06F 11/2076; G06F 11/2092; G06F 11/2094
See application file for complete search history.

(56) References Cited

U.S. PATENT DOCUMENTS

| | | | |
|---|---|---|---|
| 7,831,550 B1 | 11/2010 | Pande et al. | |
| 10,795,786 B1 * | 10/2020 | Potnis | G06F 3/065 |
| 11,573,973 B1 | 2/2023 | Vishnoi et al. | |

(Continued)

OTHER PUBLICATIONS

Notice of Allowance issued in U.S. Appl. No. 18/277,949, dated Oct. 28, 2024.

(Continued)

*Primary Examiner* — Katherine Lin
(74) *Attorney, Agent, or Firm* — Hogan Lovells Cadwalader US LLP

(57) ABSTRACT

A storage platform (100) improves data flow when modifying mirrored volumes. A backup storage component (120A) that receives a service request keeps a copy of change data when redirecting the service request to a primary storage component (120B) that owns the volume that the service request targets. The primary storage (120B) component does not need to return the change data to the backup storage component (120A) when the primary storage component (120B) instructs the backup storage component (120A) to apply the modification request to the backup copy of the volume.

20 Claims, 2 Drawing Sheets

(56) References Cited

U.S. PATENT DOCUMENTS

| | | | |
|---|---|---|---|
| 2003/0188035 A1 | 10/2003 | Lubbers et al. | |
| 2007/0198602 A1 | 8/2007 | Ngo et al. | |
| 2011/0119763 A1 | 5/2011 | Wade et al. | |
| 2015/0161225 A1 | 6/2015 | Braddy | |
| 2019/0303470 A1 | 10/2019 | Lee et al. | |
| 2024/0370459 A1* | 11/2024 | Yang | G06F 16/00 |

OTHER PUBLICATIONS

Xiao et al., “Data Transmission and Management Based on Node Communication in Opportunistic Social Networks,” Symmetry 12:8 (2020) 1288.

* cited by examiner

EFFICIENT DATA TRANSMISSIONS BETWEEN STORAGE NODES IN REPLICATION RELATIONSHIPS

CROSS-REFERENCE TO RELATED APPLICATIONS

This application is a continuation application and claims priority to U.S. patent application Ser. No. 18/277,949, filed Aug. 18, 2023, which is a 371 Application of PCT Application No. PCT/US2022/017776, filed Feb. 24, 2022, which claims priority to U.S. Patent Application No. 63/153,222, filed Feb. 24, 2021, which are all incorporated by reference herein in their entirety for all intents and purposes.

BACKGROUND

A storage platform may provide mirrored storage volumes. For a mirrored volume, a primary storage component or node in the storage platform owns a primary volume and stores data associated with the primary volume, and a backup storage component or node in the storage platform maintains a backup volume that is a copy of the primary volume. In such cases, the primary storage node and the backup storage node may be referred to as being in a replication relationship because the backup storage node stores the data needed to replicate the primary volume. A conventional storage platform can maintain the replication relationship by having the primary storage node send all change data of the primary volume to the backup storage node whenever the primary storage component changes the primary volume. The backup storage component can use the change data to update the backup volume, so that the backup volume continues to replicate the primary volume. Accordingly, each time the storage platform receives change data for a primary volume, the change data needs to be received at or sent to the primary storage node and then sent from the primary storage node to the backup storage node. The change data commonly includes large blocks or pages of data, and repetitive transmissions of data between nodes within a storage platform take time and use data network bandwidth slowing down the performance of the storage platform. Accordingly, reducing such data transmission is desired.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

A storage platform can employ efficient data transmission when storage components or nodes are in a replication relationship if a service request changing a primary volume is initially received at a backup storage component or node that is responsible for backing up the primary volume. For a typical service request changing a shared storage volume, e.g., a write request, any storage node in a storage platform may receive the service request targeting the primary volume, and the receiving storage node then needs to identify the "primary" storage node that owns the primary volume. Assuming that the receiving storage node is not the primary storage node, the receiving storage node forwards the service request, including any change data, to the primary storage node that owns the primary volume. The primary storage node can process the service request, e.g., write the change data to an address the service request identifies in the primary volume. If the service request changes a mirrored primary volume, the primary storage node instructs a "backup" storage node, which maintains a backup volume copying the primary volume, to update the backup volume with the change data. In accordance with an example of the present disclosure, if the receiving storage node is also the backup storage node, the receiving storage node keeps a copy of the change data when sending the service request to the primary storage node. The primary storage node can then apply changes locally to the primary volume and can send simple replication instructions, e.g., just appropriate metadata, to the backup storage node, rather than retransmitting a full request including all change data. In response to the replication instructions, the receiving/backup storage node can use the retained change data to update the backup volume.

Figure 1:
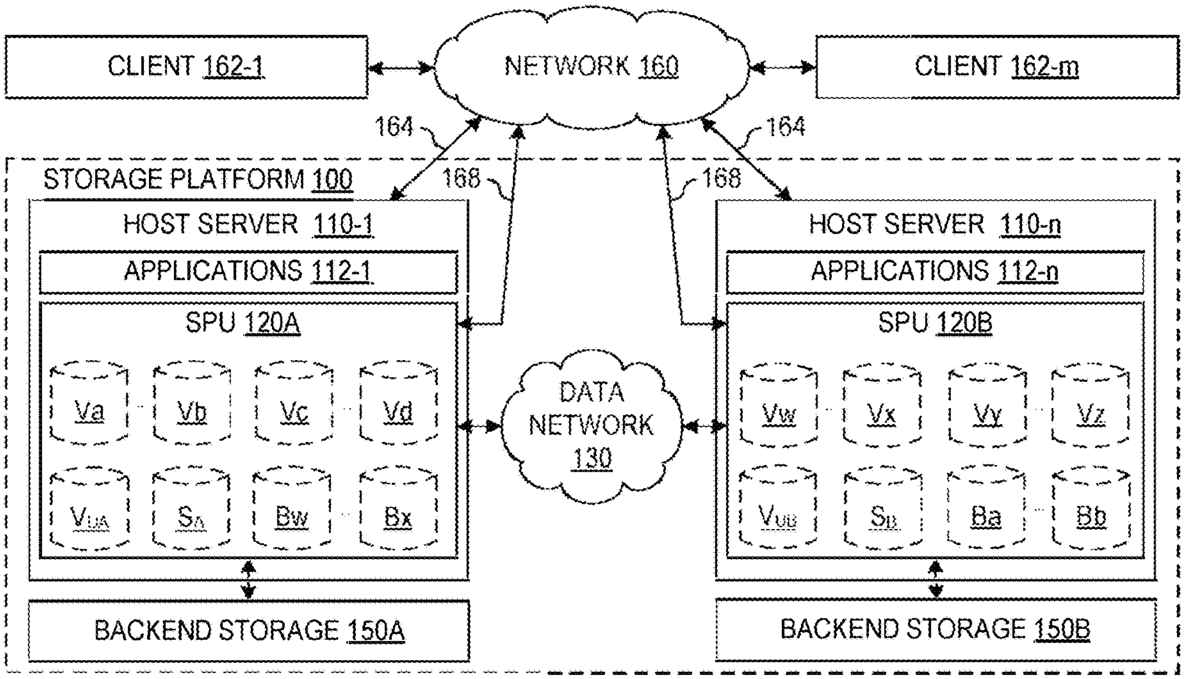
FIG. 1 is a block diagram including a storage platform in accordance with an example of the present disclosure.

FIG. 1 is a block diagram illustrating a cluster storage platform 100 in accordance with an example of the present disclosure. Storage platform 100 includes user hardware including one or more host servers 110-1 to 110-*n*, which are generically referred to herein as host server(s) 110. Servers 110 are generally computers or systems that provide resources, data, services, or programs to other computers. Each host server 110 may be a conventional computer or other computing system including a central processing unit (CPU), memory, and interfaces for connections to internal or external devices. Multiple service or storage processing units (SPUs) 120A to 120B, which are generically referred to herein as SPU(s) 120, are installed in host servers 110. Each SPU 120 is a storage component that may control or correspond to a storage node of storage platform 100. In general, storage platform 100 may include any number of host servers 110, with each server 110 hosting one or more SPUs 120. For redundancy, storage platform 100 may include at least two host servers 110 and at least two storage processing units 120. In general, storage platform 100 is scalable by adding more host servers 110 and SPUs 120 with associated backend storage 150.

Each SPU 120 may provide storage services to host servers 110, applications 112 running on servers 110, and network clients 162 via virtual volumes or logical unit numbers (LUNs). FIG. 1 particularly shows SPU 120A provides storage services relating to a set of shared volumes Va to Vb and Ve to Vd, and unshared volumes VuA and shows SPU 120B provides storage services relating to shared volumes Vw to Vx and Vy to Vz, and unshared volumes VuB. SPU 120A is sometimes referred to as "owning" shared volumes Va to Vb and Ve to Vd in that SPU 120A is normally responsible for fulfilling input-output (10) or service requests that are directed at any of volumes Va to Vb and Ve to Vd. Similarly, SPU 120B owns shared volumes Vw to Vx and Vy to Vz in that SPU 120B is normally responsible for executing service or IO requests that are directed at any of volumes Vw to Vx or Vy to Vz.

Each of volumes Va to Vb, Ve to Vd, VuA, Vw to Vx, Vy to Vz, and VuB is a storage object and may be generically referred to herein as a base volumes V. In one example of the present disclosure, each base volume V includes multiple pages or blocks that are distinguished from each other by addresses or offsets within the base volume V, and each base volume V may be a virtual volume in that the addresses or offsets are logical values that may not correspond to the physical locations where pages or blocks of data are physically stored in backend storage 150.

Each base volume V may be a "mirrored" volume having a backup volume B kept somewhere in storage platform 100. A base volume V that is mirrored is sometimes referred to herein as a primary volume V. In FIG. 1, SPU 120A maintains backup volumes Bw to Bx that copy primary volumes Vw to Vx that SPU 120B owns, and SPU 120B maintains backup volumes Ba to Bb that copy primary volumes Va to Vb that SPU 120A owns. One or more backup volumes Ba to Bb and Bw to Bx are sometimes generically referred to herein as backup volume(s) B. Backup volumes B may be virtual volumes that are copies of respective primary volumes V. Volumes Ve to Vd and Vy to Vz may be "unmirrored," meaning volumes Ve to Vd and Vy to Vz do not have associated backup volumes or may be mirrored but have backup volumes maintained in storage nodes not expressly illustrated in FIG. 1. When storage platform 100 has more than two storage nodes or SPUs 120, the set of primary volumes owned by any one SPU 120 may have backup volumes distributed among the other SPUs 120 of the storage platform 100.

SPUs 120A to 120B may also maintain one or more unshared volumes VuA to VuB that are only used by their respective host servers 110. An SPU 120 may present an unshared volume VuA or VuB, for example, as a boot LUN for the host server 110 containing the SPU 120.

Each SPU 120 controls associated backend storage 150 for storage of data corresponding to shared and unshared volumes V that the SPU 120 owns and corresponding to backup volumes B that the SPU 120 maintains. In the example of FIG. 1, SPUs 120A operates storage 150A to store the data associated with primary volumes Va to Vb and Ve to Vd, backup volumes Bw to Bx, and any unshared volumes VuA. SPUs 120B operates storage 150B to store the data associated with primary volumes Vw to Vx and Vy to Vz, backup volumes Ba to Bb, and any unshared volumes VuB.

Each component of backend storage 150 may be installed in the host server 110 containing an associated SPU 120, may include one or more external storage devices directly connected to its associate SPU 120 or host server 110, or may be network-connected storage. Backend storage 150 may employ, for example, hard disk drives, solid state drives, or other nonvolatile storage devices or media in which data may be physically stored, and backend storage 150 particularly may have a redundant array of independent disks (RAID) 5 or 6 configuration for performance and redundancy.

Each SPU 120 may be installed and fully resident in the chassis of its associated host server 110. Each SPU 120 may, for example, be implemented with a card, e.g., a PCI-e card, or printed circuit board with a connector or contacts that plug into a slot in a standard peripheral interface, e.g., a PCI bus in host server 110.

Multiple SPUs 120, e.g., SPU 120A to 120B in FIG. 1, may be connected using high speed data links, e.g., one or more parallel 10, 25, 50, 100 or more GB/s Ethernet links, to form a data network 130 for a "pod" of SPUs 120, e.g., interconnecting a cluster of storage nodes. Data network 130 may particularly be a high-speed data network that directly interconnects the SPUs 120 in a pod or cluster and may be independent of a user network 160 connecting host servers 110 and clients 162. Each SPU 120 may further employ a link 168 to connect to network 160. In some examples of storage platform 100, network 160 may provide a connection, e.g., the Internet, so that SPUs 120 may communicate with cloud-based management infrastructure providing a cloud management plane for storage platform 100.

Servers 110 provide resources to clients 162 through network connections 164 and user network 160. In some examples, network 160 includes a local or private network or a public or wide area network, e.g., the Internet, and each client 162 may be a computer including a processor, memory, and software or firmware for executing a user interface adapted to communicate over local network 160. To receive storage services, a client 162 may communicate a service request to an assigned host server 110 via network 160, and the host server 110 may communicate the service request to a resident SPU 120. In some other examples, an application 112 may be implemented in a host server 110, e.g., may run on the host server 110 to provide services to clients 162, and each application 112 does not need to communicate storage requests through network 160. An application 112 running on a server 110 may communicate an SPU 120 resident in the server 110, e.g., via a driver or similar software or firmware component.

Figure 2:
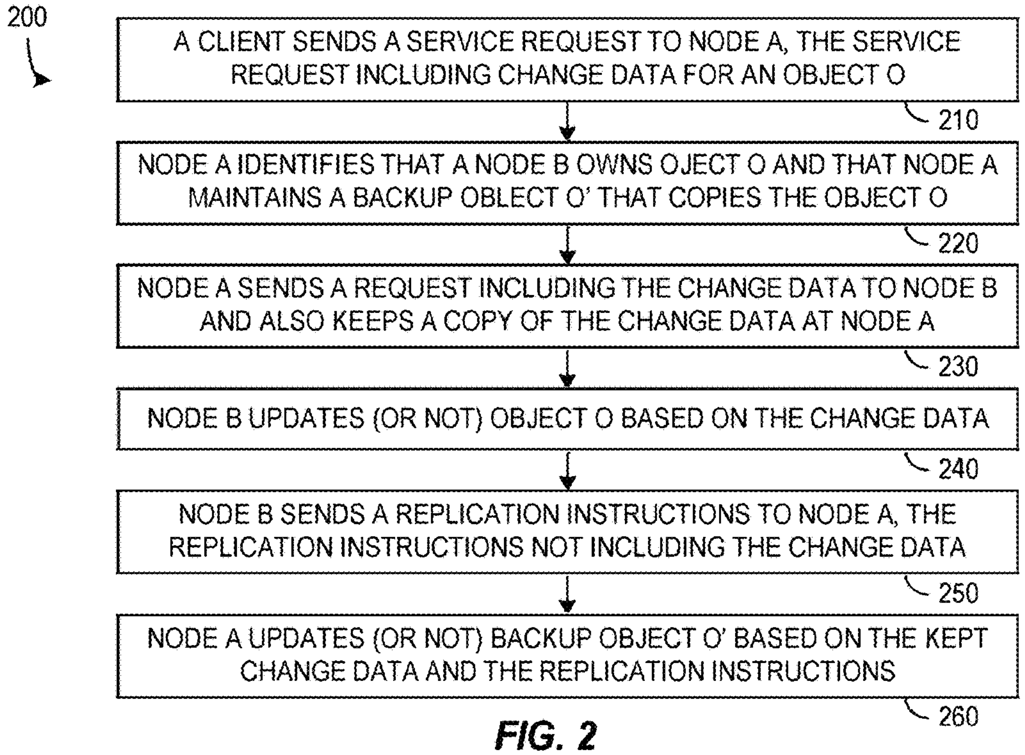
FIG. 2 is a flow diagram for a process for changing a mirrored volume in a storage platform in accordance with an example of the present disclosure.
Figure 3:
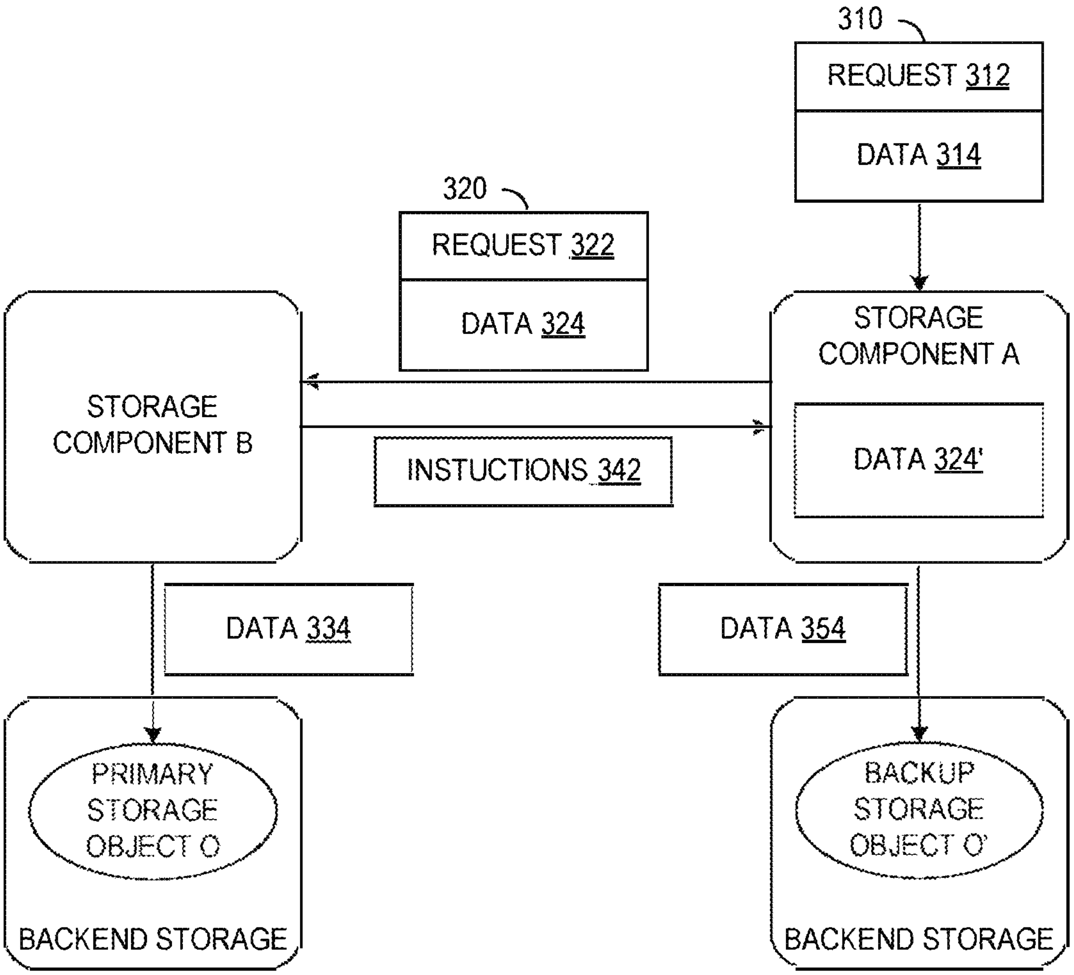
FIG. 3 illustrates data flows in a process for changing a mirrored volume in a storage platform in accordance with an example of the present disclosure.

FIG. 2 illustrates a process 200 for operating a storage platform in accordance with an example of the present disclosure, and FIG. 3 illustrates data flows during process 200. Process 200 may begin with a service request process 210 where a storage client sends a service request 310 to a receiving storage component or node A. In the example of process 200, the service request 310 requests a change in a storage object O, and the service request 310 includes change data 314 for the change in storage object O identified in a request header 312. As one illustrative example in storage platform 100 of FIG. 1, the storage client could be a particular client 162-1 on network 160 or a particular application 112-1 in a server 110-1, and the storage client may be associated with or assigned to the server 110-1, and the service request may be a write request that includes write data to be written to an address or offset in a particular base volume Vw. For a write request that a client 162-1 originated, the client 162-1 may send the write request to its assigned server, e.g., server 110-1 which contains a resident SPU 120A. SPU 120A is a storage component of the receiving storage node A in this example. Server 110-1 or application 112-1 may send the write request to SPU 120A through a driver or other software or firmware that provides an interface to SPU 120A that complies with the requirements of an operating system of server 110-1 and any relevant storage standards, e.g., small computer system interface (SCSI).

The receiving storage node A in a lookup process 220 determines that a storage node B is the primary storage node, i.e., owns the targeted storage object O, and determines that the receiving storage node A maintains a backup storage object O' for storage object O. Accordingly, for storage object O, storage node B is the primary storage node, and the receiving storage node A is also the backup storage node. In the illustrative example referring to storage platform 100, SPU 120A, which received the write request with write data to be stored at an address in volume Vw, may have a lookup table or other information provided when storage and backup volumes were created, and that lookup table or other information concerning storage platform 100 may indicate which SPU 120 owns each volume V and which SPU(s) 120 maintains backup volumes for each volume V. In the illustrative example, SPU 120-1 determines that SPU 120B owns volume Vw and that SPU 120A itself maintains backup volume Bw.

Receiving/backup storage node A in a request transmission process 230 sends to the primary storage node B a service request 320 including request metadata 322 and the change data 324. Request 320 may be modified from request 312, e.g., encrypted or reformatted according to protocols used within the storage platform. The service request 320 sent to storage node B may further indicate that storage node A has kept a copy 324' of at least the change data 324 determined from the original service request. In general, since storage node A may forward one or more additional service request before a first storage operation is complete, storage node A may keep identifying information for the change data 324', e.g., a volume ID for storage object O, a target address or offset for the change in storage object O, and/or a unique identifier of the service request. In the illustrative example, SPU 120A transmits the write request and write data through data network 130 to SPU 120B, and SPU 120A keeps the write data at least temporarily in memory in SPU 120A. SPU 120A may distinguish retained change data for multiple ending service requests using identifiers, which SPU 120A may forward to SPU 120B as part of request transmission process 230.

Primary storage node B in a storage process 240 performs appropriate processing of the received service request. Primary storage node B may modify storage object O based on the change data 334 and the type of service requested. In the illustrative example based on storage platform 100, SPU 120B performs a write operation to write the change data at the target address in primary volume Vw.

Primary storage node B in a reply process 250, after performing appropriate processing 240 of the service request 320, returns to backup node A only simple replication instructions 342 that do not include the change data. The replication instructions 342 may include only metadata that backup node A needs to perform a replication operation, e.g., to identify the change data 324' retained in backup node A and make the data changes 354 required for backup object O' to replicate object O. In the illustrative example based on storage platform 100, SPU 120B may transmit replication instructions through network 130 to SPU 120A, and the replication instructions may include a unique identifier that SPU 120A uses to identify the change data and identify the service request that SPU 120A needs to perform on backup volume Bw.

Backup storage node A in a storage process 260 modifies backup storage object O' using the change data 324' that backup storage node A retained in process 230 and identified from the replication instructions 342 transmitted to backup storage node A in process 250. In the illustrative example based on storage platform 100, SPU 120A writes the write data to backup volume Bw.

Previous approaches to implementing replication relationships treated forwarding a service request from a receiving storage node to a primary storage node and replicating changes at a backup storage node as independent operations and therefore failed to take advantage of the fact that the backup storage node may already have the bulk of the data required to replicate changes. Accordingly, conventional replication systems and processes generally required transmitting a block of change data from the receiving storage node to the primary storage node that changes the primary volume and then again transmitting the block of change data to the backup storage node or nodes that change the backup volumes. Process 200 avoids the need to retransmit the block of change data to a backup storage node when the backup storage node is the receiving storage node. Avoiding the unnecessary copying of change data across the data network of a storage platform as in process 200 reduces use of network resources and may allow a data network to accommodate a higher capacity of mirrored storage in a storage platform. Additionally, operations copying of data blocks across a data network take time even in high-speed networks and thus transmitting a smaller quantity of data (e.g., just metadata in replication instructions) lowers the time taken to send the data and thus may allow faster completion of service requests.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although implementations have been disclosed, these implementations are only examples and should not be taken as limitations. Various adaptations and combinations of features of the implementations disclosed are within the scope of the following claims.

What is claimed is:

1. A backup storage component, comprising:

at least one storage medium; and one or more processing units to:

receive a service request to modify, according to a set of change data, a volume stored in a primary storage component;

retain the change data associated with the service request;

transmit the service request, including the change data, to the primary storage component for applying the modification to the volume;

receive replication instructions from the primary storage component, the replication instructions including metadata associated with the modification but not including the change data; and update a copy of the volume, stored in the at least one storage medium associated with the backup storage component, using the retained change data and the metadata included in the replication instructions.

2. The backup storage component of claim 1, wherein the service request is a write request and the set of change data comprises write data to be written to an address associated with the volume.

3. The backup storage component of claim 1, wherein the one or more processing units are further configured to:

determine, based on a lookup table, that the primary storage component of a plurality of primary storage components stores the volume associated with the change data.

4. The backup storage component of claim 1, wherein the one or more processing units are further configured to encrypt the service request prior to transmitting the service request to the primary storage component.

5. The backup storage component of claim 1, wherein the service request further comprises one or more of a volume identification data associated with the volume, and a target address and an offset associated with the modification.

6. The backup storage component of claim 1, wherein the one or more processing units are further configured to retain the change data in a temporary memory of the backup storage component before transmitting the service request to the primary storage component.

7. The backup storage component of claim 1, wherein the received replication instructions further include a unique identifier corresponding to the service request and the retained change data, the unique identifier being used to match the retained change data with the service request for applying the modification to the copy of the volume.

8. A system, comprising:

one or more processing units to:

receive a service request to modify a volume stored in a primary storage component, the service request indicating change data;

cause a backup storage component that stores a copy of the volume to retain the change data associated with the service request;

transmit the service request, including the change data, to the primary storage component for applying the modification to the volume;

receive replication instructions from the primary storage component, the replication instructions including metadata associated with the modification but not including the change data; and cause the backup storage component to update the copy of the volume using the retained change data and the metadata included in the replication instructions.

9. The system of claim 8, wherein the system further comprises one or more additional backup storage components that store one or more additional copies of the volume.

10. The system of claim 8, wherein the backup storage component comprises a first service processing unit in a first server and the primary storage component comprises a second service processing unit in a second server.

11. The system of claim 10, wherein the service request is transmitted through a first network to the primary storage unit in the second server.

12. The system of claim 11, wherein the replication instructions are received over a second network independent of the first network.

13. The system of claim 8, wherein the one or more processing units are further configured to encrypt the service request prior to transmitting the service request to the primary storage component.

14. The system of claim 8, wherein the received replication instructions further include a unique identifier corresponding to the service request and the retained change data, the unique identifier being used to match the retained change data with the service request for applying the modification to the copy of the volume.

15. A processor configured to:

receive a service request to modify a volume stored in a primary storage component;

cause a backup storage component that stores a copy of the volume to retain change data associated with the service request;

transmit the service request, including the change data, to the primary storage component;

receive, from the primary storage component, replication instructions including metadata associated with the modification but not including the change data; and cause the backup storage component to update the copy of the volume using the retained change data and the metadata included in the replication instructions.

16. The processor of claim 15, wherein the service request is a write request and the change data comprises write data to be written to an address associated with the volume.

17. The processor of claim 15, wherein the processor is further configured to encrypt the service request prior to transmitting the service request to the primary storage component.

18. The processor of claim 15, wherein the backup storage component resides in a first server and the primary storage component resides in a second server.

19. The processor of claim 18, wherein the service request is transmitted through a first network to the primary storage unit in the second server.

20. The processor of claim 19, wherein the replication instructions are received over a second network independent of the first network.

* * * * *